US012806781B2

(12) United States Patent
Fujimoto

(10) Patent No.: US 12,806,781 B2
(45) Date of Patent: Nov. 24, 2026

(54) INFORMATION PROCESSING APPARATUS

(71) Applicant: FANUC CORPORATION, Yamanashi (JP)

(72) Inventor: Takeshi Fujimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 18/837,189

(22) PCT Filed: Feb. 25, 2022

(86) PCT No.: PCT/JP2022/008000
§ 371 (c)(1),
(2) Date: Aug. 9, 2024

(87) PCT Pub. No.: WO2023/162168
PCT Pub. Date: Aug. 31, 2023

(65) Prior Publication Data
US 2025/0135647 A1 May 1, 2025

(51) Int. Cl.
*B25J 9/16* (2006.01)
*B25J 13/08* (2006.01)

(52) U.S. Cl.
CPC ........... *B25J 9/1674* (2013.01); *B25J 9/1656* (2013.01); *B25J 13/089* (2013.01)

(58) Field of Classification Search
CPC ....... B25J 9/1674; B25J 9/1656; B25J 13/089
See application file for complete search history.

(56) References Cited

U.S. PATENT DOCUMENTS

2019/0129381 A1* 5/2019 Tanno .................... G01R 31/58
2022/0317659 A1* 10/2022 van Baar ................. B25J 9/161

FOREIGN PATENT DOCUMENTS

| | | | |
|---|---|---|---|
| JP | H08-118284 | A | 5/1996 |
| JP | 2014-233763 | A | 12/2014 |
| JP | 2017-190983 | A | 10/2017 |
| JP | 2018-062026 | A | 4/2018 |
| JP | 2019-135076 | A | 8/2019 |
| WO | 2017175340 | A1 | 10/2017 |

* cited by examiner

*Primary Examiner* — Jonathan L Sample
*Assistant Examiner* — Heather J Keniry
(74) *Attorney, Agent, or Firm* — HAUPTMAN HAM, LLP

(57) ABSTRACT

An information processing apparatus according to one aspect of the present disclosure includes an acceleration vector calculation unit configured to calculate, based on an operation program or operation information when a robot device is actually operated in accordance with the operation program, a plurality of acceleration vectors corresponding to a plurality of time points during a period in which a reference position of the robot device moves from a starting point to an ending point, and an index value calculation unit configured to calculate, based on the plurality of acceleration vectors, a plurality of index values which serve as index for evaluating a stress amplitude acting on the reference position.

7 Claims, 11 Drawing Sheets

Operation program

1. Teaching point 1. Joint Position[A] 100% FINE

2. Teaching point 2. Joint Position[B] 100% FINE

3. Standby 5.00(sec)

4. Teaching point 3. Joint Position[C] 100% FINE

5. Standby 5.00(sec)

6. Teaching point 4. Joint Position[A] 100% FINE

Fig. 7

INFORMATION PROCESSING APPARATUS

RELATED APPLICATIONS

The present application is a National Phase of International Application No. PCT/JP2022/008000 filed Feb. 25, 2022.

TECHNICAL FIELD

This disclosure relates to an information processing apparatus.

BACKGROUND ART

Robots are widely used in assembly plants, food factories, and the like because they can be made to perform various tasks by following pre-created operation programs. One of the reasons for the increased use of robots is the improvement of technology to ensure their safety. For example, in order to limit the speed and acceleration of a robot entering a specified area, it is known to determine whether or not the position of the tip of a tool is in an operation restriction area of an arbitrary size set by coordinate values in a world coordinate system, and to limit at least one of the speed and acceleration of the robot when the position of the tip of the tool is in the operation restriction area (for example, Patent Literature 1).

As described above, many techniques have been proposed for reducing the risk of workers being injured or peripheral devices being damaged by the operation of the robot. However, many techniques that reduce the risk of the robot itself or end-effectors attached to the robot being damaged by the operation of the robot have not been proposed, leaving room for technological development. In particular, since the end effectors mounted on the robot have different load capacities and stiffness values, they are subjected to large inertial forces due to acceleration and deceleration of the robot, which can cause fatigue accumulation and unexpected fatigue fracture.

CITATION LIST

Patent Literature

Patent Literature 1: Japanese Unexamined Patent Application Publication No. 2018-062026

BRIEF DESCRIPTION OF THE DRAWINGS

FIG. 7 is a diagram supplementary to the explanation of the modification process of a program modification unit shown in FIG. 2.

DETAILED DESCRIPTION

Figure 1:
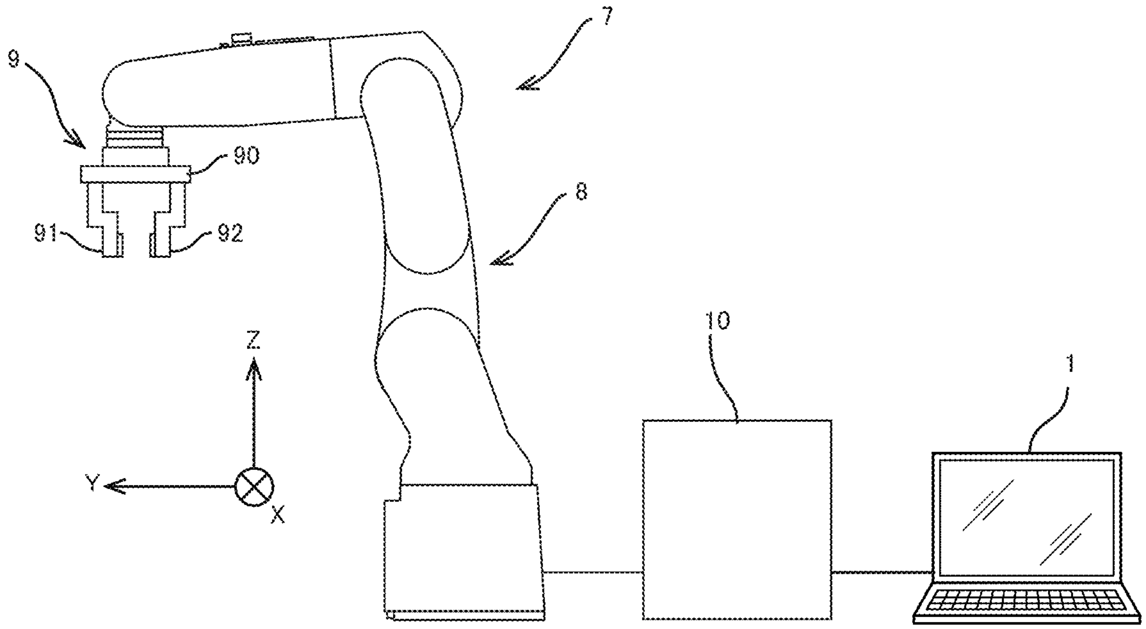
FIG. 1 shows an example of a robot system including an information processing apparatus according to the present embodiment.

An information processing apparatus according to one aspect of the present disclosure includes an acceleration vector calculation unit configured to calculate, based on an operation program or operation information when a robot device is actually operated in accordance with the operation program, a plurality of acceleration vectors corresponding to a plurality of time points during a period in which a reference position of the robot moves from a starting point to an ending point, and an index value calculation unit configured to calculate, based on the plurality of acceleration vectors, a plurality of index values which serve as an index for evaluating a stress amplitude acting on the reference position.

Hereinafter, an information processing apparatus according to the present embodiment will be described with reference to the drawings. In the following description, constituent elements having substantially the same function and configuration are denoted by the same reference numeral, and repetitive descriptions will be given only where necessary.

One feature of the information processing apparatus according to the present embodiment (hereinafter simply referred to as an information processing apparatus) is that it has a function of evaluating an operation program, specifically, a function of calculating an index value for determining the possibility of fatigue fracture occurring at a specific point of a robot device when the robot device is operated in accordance with the operation program. This feature allows, for example, the user to determine the possibility of fatigue fracture occurring at a specific point of the robot device by checking the index value, and to modify the operation program as necessary. The determination of the possibility of fatigue fracture occurring at a specific point of the robot device can also be done automatically by comparing the index value with a threshold value. The modification of the operation program can also be done automatically based on the index value and the threshold value.

As shown in FIG. 1, an information processing apparatus 1 is configured to be connectable to a control device 10 that controls a robot device 7. For example, the information processing apparatus 1 provides the control device 10 with an operation program modified in the information processing apparatus 1. The information processing apparatus 1 also receives an operation program to be evaluated from the control device 10. The control device 10 controls the robot device 7 in accordance with the operation program. In the present embodiment, the robot device 7 includes a robot arm mechanism 8 having a plurality of joint parts and a robot hand 9 installed at a wrist part of the robot arm mechanism 8. The robot hand 9 includes a base 90 and a pair of fingers 91 and 92 provided on the base 90 to be openable and closable.

Figure 2:
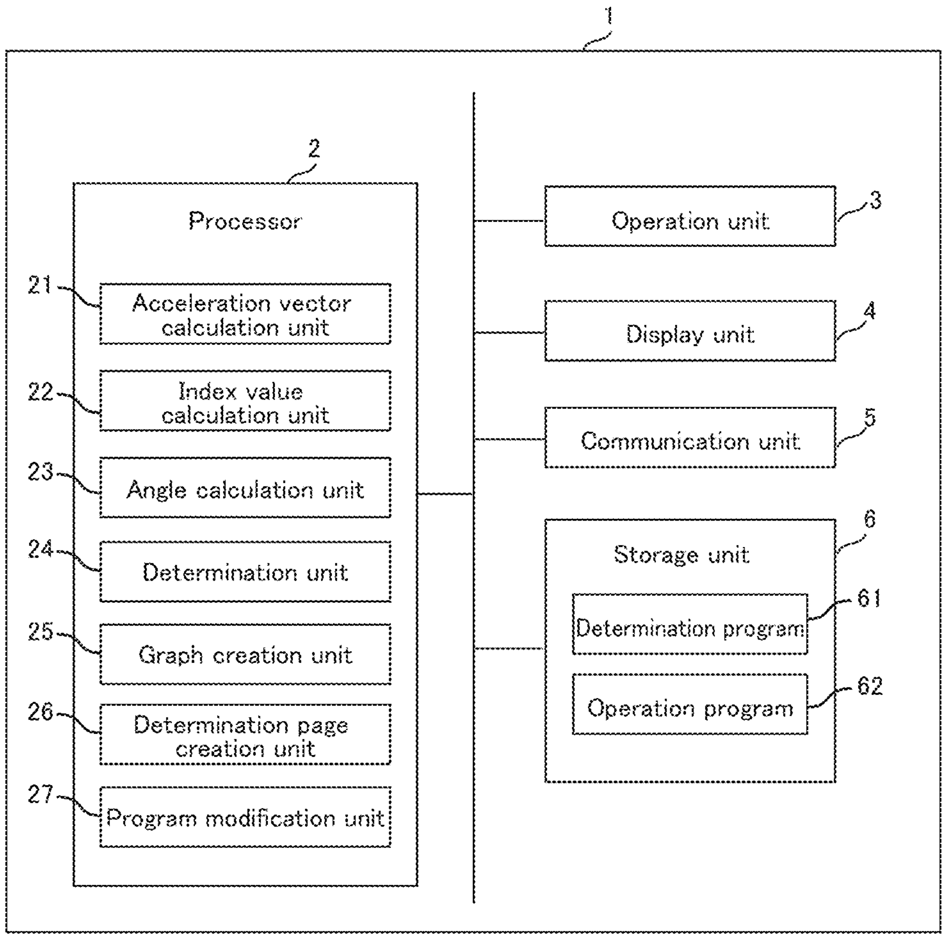
FIG. 2 is a functional block diagram of the information processing apparatus according to the present embodiment.

As shown in FIG. 2, the information processing apparatus 1 is configured by connecting hardware such as an operation unit 3, a display unit 4, a communication unit 5, and a storage unit 6 to a processor 2 (such as a CPU). The information processing apparatus 1 is provided by a general personal computer, a tablet, or the like.

The operation unit 3 includes an input device such as a keyboard, a mouse, and a jog. Note that a touch panel or the like that serves as both the operation unit 3 and the display unit 4 may be used. The user can input various types of information into the information processing apparatus 1 through the operation unit 3.

The various types of information include input operation information of a reference position of the robot device 7 which is a target for determining the possibility of fatigue fracture, and input operation information on the determination page displayed on the display unit 4. In the present embodiment, the reference position of the robot device 7 is set at the robot hand 9. Hereinafter, the reference position of the robot device 7 will be denoted as the robot hand 9.

The display unit 4 includes a display device such as an LCD. The display unit 4 displays the determination page created by a determination page creation unit 26. Further, the display unit 4 displays the possibility of fatigue fracture occurring in the robot hand 9 determined by a determination unit 24. As a display mode, the possibility of fatigue fracture occurring may be displayed as a percentage, or the time until the fatigue fracture occurs may be displayed.

The storage unit 6 includes a storage device such as an HDD or an SSD. Multiple types of data are stored in advance in the storage unit 6. The multiple types of data include a determination program 61, an operation program 62 which is a target of determination, and a threshold value. The operation program 62 describes an operation position command for the robot device 7, and the like. The threshold value is a value for evaluating the index value, is used in a determination process by the determination unit 24 to be described later, and is displayed on a graph corresponding to the time variation of the maximum value of index values.

The communication unit 5 controls transmission and reception of data to and from the control device 10. For example, an operation program 62 modified by the information processing apparatus 11 is provided to the control device through the processing of the communication unit 5.

When the determination program 61 stored in the storage unit 6 is executed by the processor 2, the information processing apparatus 11 functions as an acceleration vector calculation unit 21, an index value calculation unit 22, an angle calculation unit 23, a determination unit 24, a graph creation unit 25, a determination page creation unit 26, and a program modification unit 27.

The acceleration vector calculation unit 21 calculates, based on the operation program 62, a plurality of acceleration vectors respectively corresponding to a plurality of time points during a period in which the robot hand 9 moves from the starting point to the end point. The plurality of time points are set at equal intervals in time. Of course, the plurality of time points may be set so that the distance intervals are equally spaced.

The index value calculation unit 22 calculates a plurality of index values which serve as indices for evaluating the stress amplitude acting on the robot hand 9, based on the plurality of acceleration vectors calculated by the acceleration vector calculation unit 21. Specifically, the index value calculation unit 22 calculates an inner product value of two acceleration vectors among the plurality of acceleration vectors. Details of the calculation process by the index value calculation unit 22 will be described later.

The angle calculation unit 23 calculates values corresponding to angles of the plurality of acceleration vectors calculated by the acceleration vector calculation unit 21 with respect to a reference axis. Specifically, the angle calculation unit 23 calculates a sine value of an angle formed by an acceleration vector and a reference axis as a value corresponding to the angle. Details of the calculation process by the angle calculation unit 23 will be described later.

The determination unit 24 determines, based on the plurality of index values calculated by the index value calculation unit 22, the possibility of fatigue fracture occurring in the robot hand 9 when the robot device 7 is operated in accordance with the operation program 62. For example, the determination unit 24 determines the possibility of fatigue fracture occurring in the robot hand 9 by comparing a plurality of index values calculated by the index value calculation unit 22 with a threshold value. Specifically, the determination unit 24 determines the possibility of fatigue fracture occurring in the robot hand 9 by comparing the minimum value of the index values with the threshold value. Note that the determination unit 24 may determine the possibility of fatigue fracture occurring in the robot hand 9, based on the plurality of index values calculated by the index value calculation unit 22 and the plurality of angles calculated by the angle calculation unit 23.

The graph creation unit 25 creates multiple types of graphs. The multiple types of graphs include a graph showing the time variation of index values, a graph showing the time variation of angles, and a graph showing the time variation of acceleration vectors. The graph showing the time variation of index values is created based on the plurality of index values calculated by the index value calculation unit 22. Specifically, based on the plurality of inner product values calculated by the index value calculation unit 22, a graph corresponding to the time variation of the maximum value of the index values, a graph corresponding to the time variation of the index value with a specific time point as a reference time point, and the like are created. The graph showing the time variation of angles is created based on the plurality of angles calculated by the angle calculation unit 23. The graph showing the time variation of acceleration vectors is created based on the plurality of acceleration vectors calculated by the acceleration vector calculation unit 21. The graph showing the time variation of acceleration vectors includes a graph about each axis of the three orthogonal axes and a graph about absolute values of acceleration vectors.

The determination page creation unit 26 creates a determination page in accordance with a predetermined format. The determination page created by the determination page creation unit 26 is displayed on the display unit 4. Details of the determination page will be described later.

The program modification unit 27 modifies the operation program 62 based on the result of the determination by the determination unit 24. The modification process of the operation program 62 by the program modification unit 27 will be described later in detail.

Figure 3:
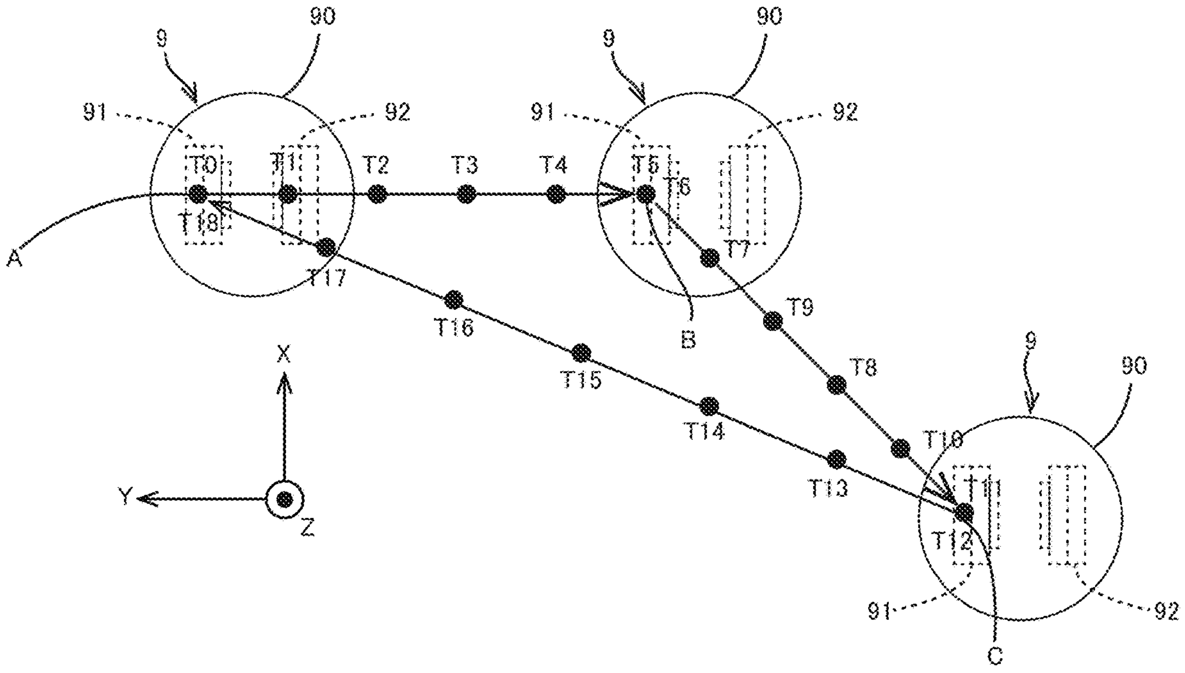
FIG. 3 shows the movement trajectory of a robot hand when the robot hand is operated in accordance with an operation program shown in FIG. 2.

FIG. 3 shows an example of the movement trajectory of the robot hand 9 when the robot device 7 is operated in accordance with the operation program 62. Here, in order to simplify the description, it is assumed that the robot hand 9 moves in translation on the XY plane. As shown in FIG. 3, when the robot device 7 is operated in accordance with the operation program 62, the robot hand 9 is caused to move in translation from the standby position A to the picking position B and then to the release position C, and is returned to the standby position A.

Figure 4:
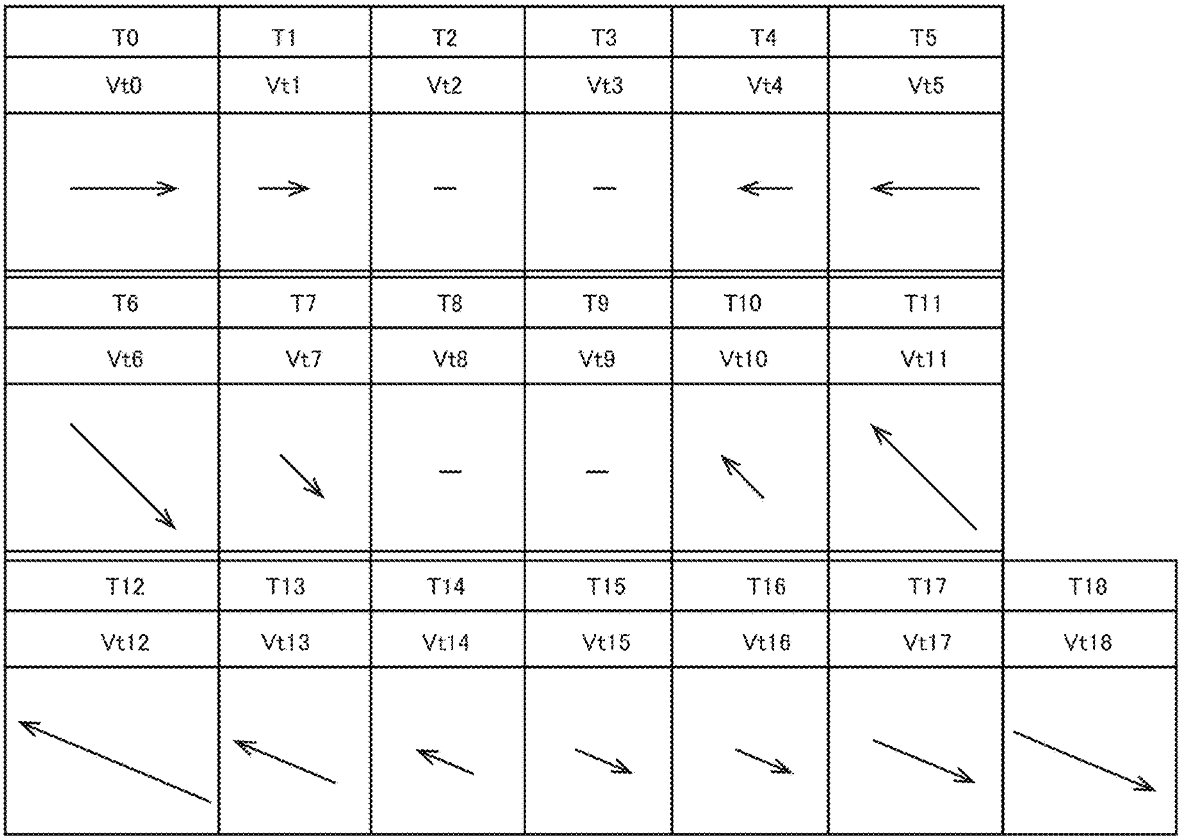
FIG. 4 shows acceleration vectors calculated by an acceleration vector calculation unit shown in FIG. 2.

The acceleration vector calculation unit 21 calculates a plurality of acceleration vectors (Vt0, Vt1, . . . , and Vt18) respectively corresponding to a plurality of time points (T0, T1, . . . , and T18) during a moving period from the standby position A as the starting point until the robot hand 9 is returned to the standby position A as the ending point via the picking position B and the release position C. FIG. 4 shows an example of a plurality of acceleration vectors (Vt0, Vt1, . . . , and Vt18) calculated by the acceleration vector calculation unit 21. Since the robot hand 9, which is the reference position of the robot device 7, moves in translation on the XY plane, the acceleration vector is expressed only by the XY components. For example, since the time point TO immediately after the robot hand 9 starts to move in the −Y direction from the standby position A toward the picking position B is in the acceleration period of the robot hand 9, the absolute value of the acceleration vector Vt0 corresponding to the time point T0 is large and the direction is the −Y direction. Since the time points T2 and T3 after predetermined times have elapsed since the robot hand 9 started moving from the standby position A toward the picking position B are in the constant speed period of the robot hand 9, the absolute values of the acceleration vectors Vt2 and Vt3 corresponding to the time points T2 and T3, respectively, are 0. Since the time point T5 immediately before reaching the picking position B is in the braking period of the robot hand 9, the absolute value of the acceleration vector Vt5 corresponding to the time point T5 is large and the direction is the +Y direction.

The index value calculation unit 22 calculates, as an index value, an inner product value of acceleration vectors for each combination of two time points of a plurality of time points (T0, T1, . . . , and T18). In other words, the index value calculation unit 22 calculates the inner product value of two acceleration vectors out of the plurality of acceleration vectors (Vt0, Vt1, . . . , and Vt18) by a round robin method.

Figure 5:
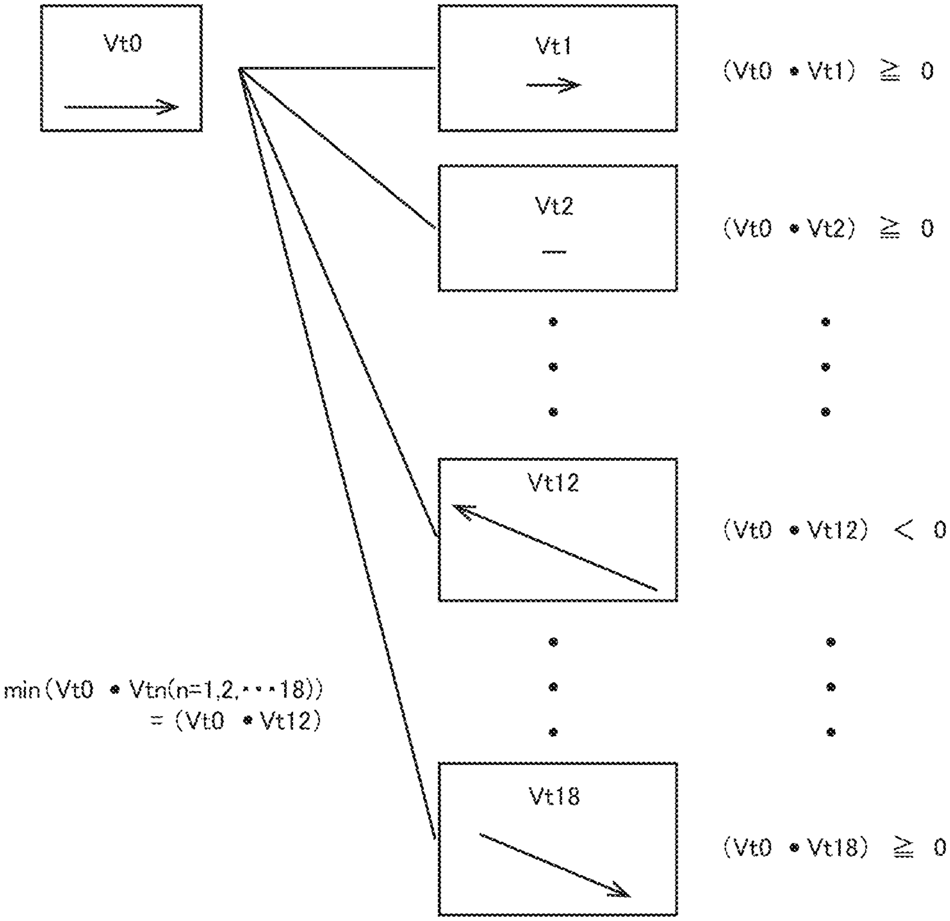
FIG. 5 is a diagram supplementary to the explanation of the calculation process of an index value calculation unit shown in FIG. 2.

FIG. 5 is a supplementary diagram for explaining the calculation process by the index value calculation unit 22. FIG. 5 shows a calculation example of the inner product values when the time point T0 is used as a reference among the plurality of time points (T0, T1, . . . , and T18). As shown in FIG. 5, the index value calculation unit 22 calculates the inner product values of the acceleration vectors (Vt0 and Vt1, Vt0 and Vt2, . . . , and Vt0 and Vt18) for respective combinations of the reference time point TO and the other time points (T1, T2, . . . , and T18). Similarly, the index value calculation unit 22 moves the reference time point to T1, and calculates the inner product values of the acceleration vectors (Vt1 and Vt0, Vt1 and Vt2, . . . , and Vt1 and Vt18) for respective combinations of the reference time point T1 and the other time points (T0, T2, . . . , and T18). As described above, one reference time point is taken from the plurality of time points during the period in which the robot hand 9 moves from the starting point to the ending point on the movement trajectory defined by the operation program 62, and the inner product values of the acceleration vectors between the reference time point and respective time points other than the reference time point are calculated. The same calculation is repeated while switching the reference time point. Such a method in which two time points are taken from a plurality of time points by a permutation to calculate inner product values is referred to as a round robin method.

The inner product value itself does not directly indicate the magnitude of the amplitude of the stress acting on the robot hand 9. It is known that fatigue fracture of a member depends on the magnitude of the stress amplitude occurring in the member. This stress amplitude increases when two inertia forces in opposite directions act on the member. By obtaining the inner product values, it is possible to identify a pair of operation points (time points) by which inertial forces in the opposite directions may be applied to the robot hand 9 in a series of operation periods of the robot hand 9. As is well known, the inner product value of the acceleration vectors (Vt0, Vt1) between the time points T0 and T1 is given by $|Vt0|\cdot|Vt1|\cdot\cos\theta$, where θ is an angle formed by the two acceleration vectors. When the polarity of the inner product value of two acceleration vectors respectively corresponding to two time points is negative, it means that the two acceleration vectors form an angle larger than 90 degrees and smaller than 270 degrees. The two acceleration vectors whose inner product value has negative polarity are a pair that causes two inertial forces in opposite directions on the robot hand 9. Of course, the larger the absolute value of the inner product value, the larger the inertial forces acting on the robot hand 9. In other words, the polarity of the inner product value is negative and the larger the absolute value, the larger the stress amplitude acting on the robot hand 9. As described above, the fatigue fracture depends on the magnitude of the stress amplitude, and the magnitude of the stress amplitude corresponds to the polarity and the absolute value of the inner product value; therefore, the inner product value of acceleration vectors can be used for determining the possibility of fatigue fracture. In the present embodiment, the inner product value and the index value are related so that the smaller the inner product value, the larger the index value. When the index value calculated by the index value calculation unit 22 is large, the user can determine that the stress amplitude acting on the robot hand 9 is large and that fatigue fracture is likely to occur.

The angle calculation unit 23 calculates the angle of an acceleration vector with respect to a reference axis. It is desirable that the reference axis is set in a direction that is vulnerable to fatigue fracture at the reference position of the robot device 7. For example, the direction that is vulnerable to fatigue fracture corresponds to the thickness direction of the member. When a stress amplitude acts on a thick member in the thickness direction, even if the stress amplitude is large, it is unlikely to cause fatigue fracture. On the other hand, when a stress amplitude is applied to a thin member in the thickness direction, even if the stress amplitude is small, it may cause fatigue fracture. Accordingly, by considering not only the magnitude of the stress amplitude acting on the reference position of the robot device 7 but also the direction of the stress amplitude, the possibility of fatigue fracture can be determined in more detail.

Figure 6:
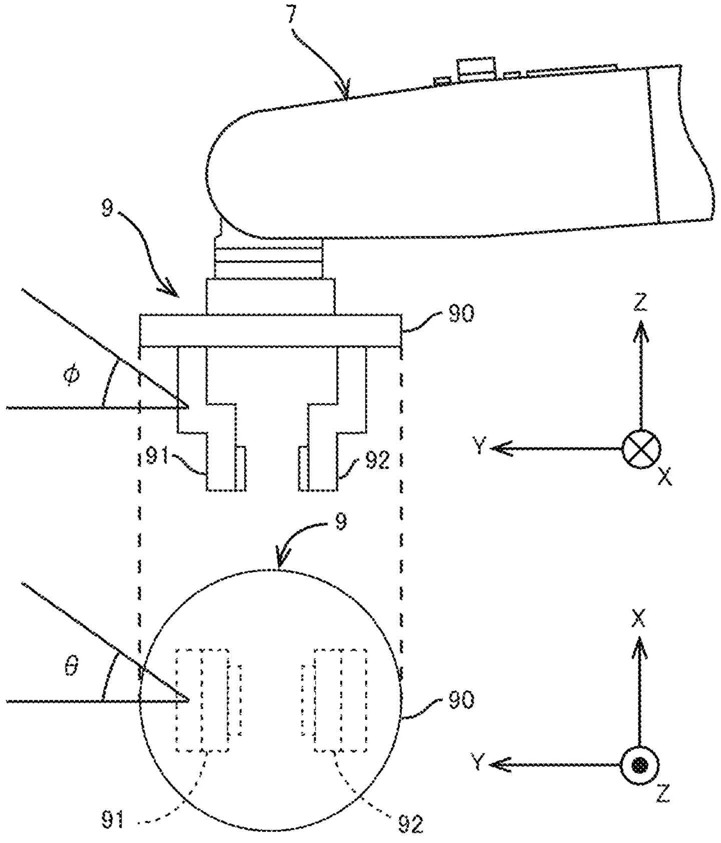
FIG. 6 is a diagram supplementary to the explanation of the calculation process of an angle calculation unit shown in FIG. 2.

In the present embodiment, as shown in FIG. 6, in the robot hand 9, which is the reference position of the robot device 7, the reference axis is set to the Y-axis because the fingers 91 and 92 are thin and vulnerable to fatigue fracture. The angle calculation unit 23 calculates the sine value of the horizontal angle θ and the sine value of the vertical angle φ as the horizontal angle θ and the vertical angle φ of each of the acceleration vectors (Vt0, Vt1, . . . , and Vt18) with respect to the reference axis (Y-axis). Since the acceleration vectors (Vt0, Vt1, . . . , and Vt18) include only the XY components, the sine value of the vertical angle φ is assumed to be '0', and the description thereof will be omitted in the present embodiment. The angle calculation unit 23 calculates the sine value of the horizontal angle θ between the reference axis (Y-axis) and each of the acceleration vectors (Vt0, Vt1, . . . , and Vt18). The sine value calculated by the angle calculation unit 23 is "0" when the reference axis and the acceleration vector are parallel. When the reference axis and the acceleration vector are orthogonal to each other, it is "1".

The program modification unit 27 modifies the operation program 62 based on the result of the determination by the determination unit 24. FIG. 7 shows an example of the operation program 62. As shown in FIG. 7, for example, the operation program 62 describes various commands aligned in accordance with the order of operation. Operation orders 3 and 6 are standby commands, and operation orders 1, 2, 4, and 6 are operation position commands. The operation position command is associated with an operation position, an interpolation format, a movement format, and an operation speed. The operation position "Position 'A'" indicates moving to the teaching position A. The interpolation format is a condition relating to the interpolation format between two teaching points. For example, the interpolation format "Joint" indicates performing circular interpolation between two teaching points so as not to apply a load to each joint part of the robot device 7. The interpolation format includes other interpolation formats such as linear interpolation. The movement format is a condition relating to how to move the robot device between two teaching points. For example, the movement format "FINE" indicates moving the robot device 7 so that it always passes through the teaching points. The operation speed is an operation speed of the robot device 7 and is expressed as a percentage of a predefined maximum speed. For example, the operation speed "100%" indicates that the robot device 7 is moved at the maximum speed.

When it is determined, based on the result of the determination by the determination unit 24, that the operation program 62 includes a time point that is likely to cause fatigue fracture in the robot hand 9, the program modification unit 27 modifies the operation program 62 so as to reduce the operation speed so that the speed at that time point is reduced. For example, when it is determined that an instantaneous operation at a time point between the position A and the position B is a time point that is likely to cause fatigue fracture in the robot hand 9, the operation speed of the operation order 2 is reduced from "100%" to "90%" in order to reduce the operation speed between the position A and the position B. The item of the operation program 62 to be modified is not limited to the operation speed. For example, the setting item of acceleration/deceleration may be modified so that the acceleration/deceleration becomes gradual, or the movement format may be modified so that the movement trajectory from the position A to the position B is changed.

Figure 8:
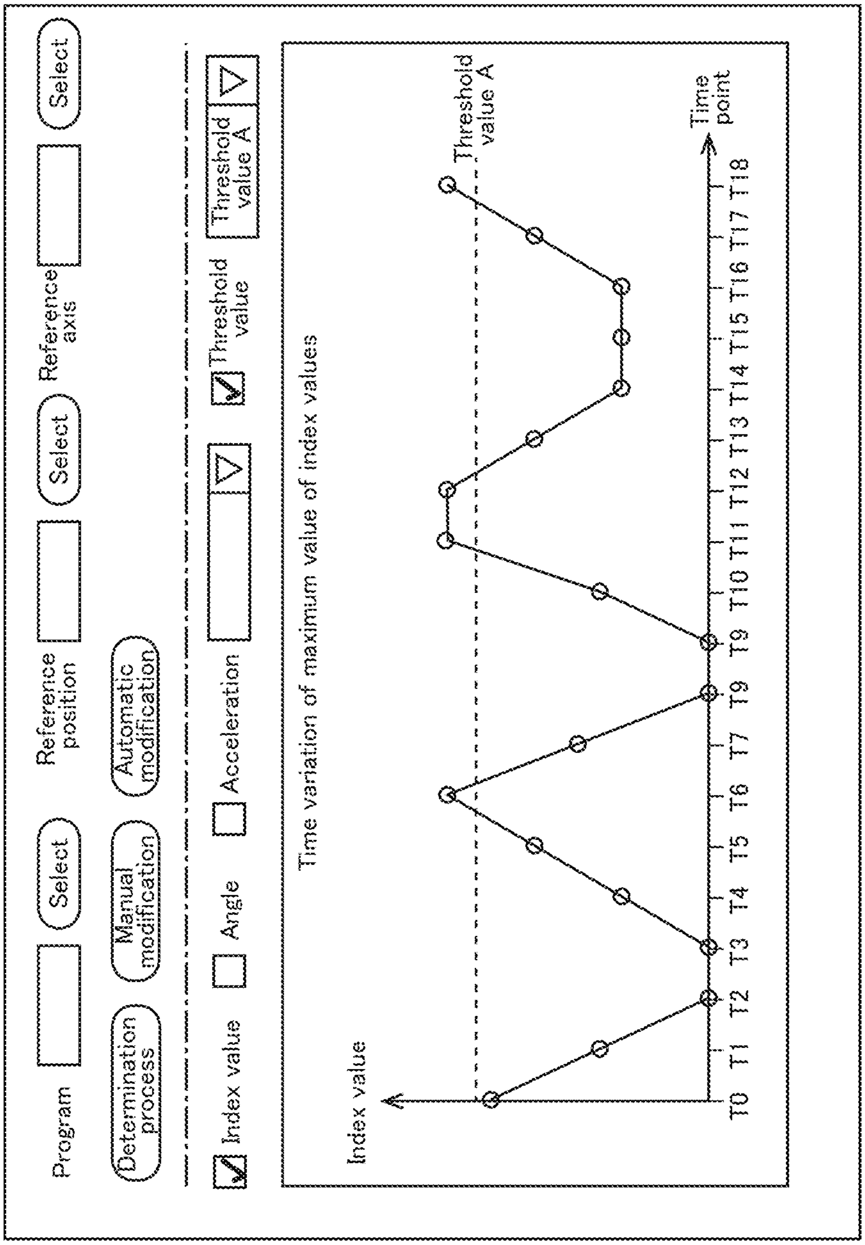
FIG. 8 shows a first example of a determination page created by a determination page creation unit shown in FIG. 2.
Figure 9:
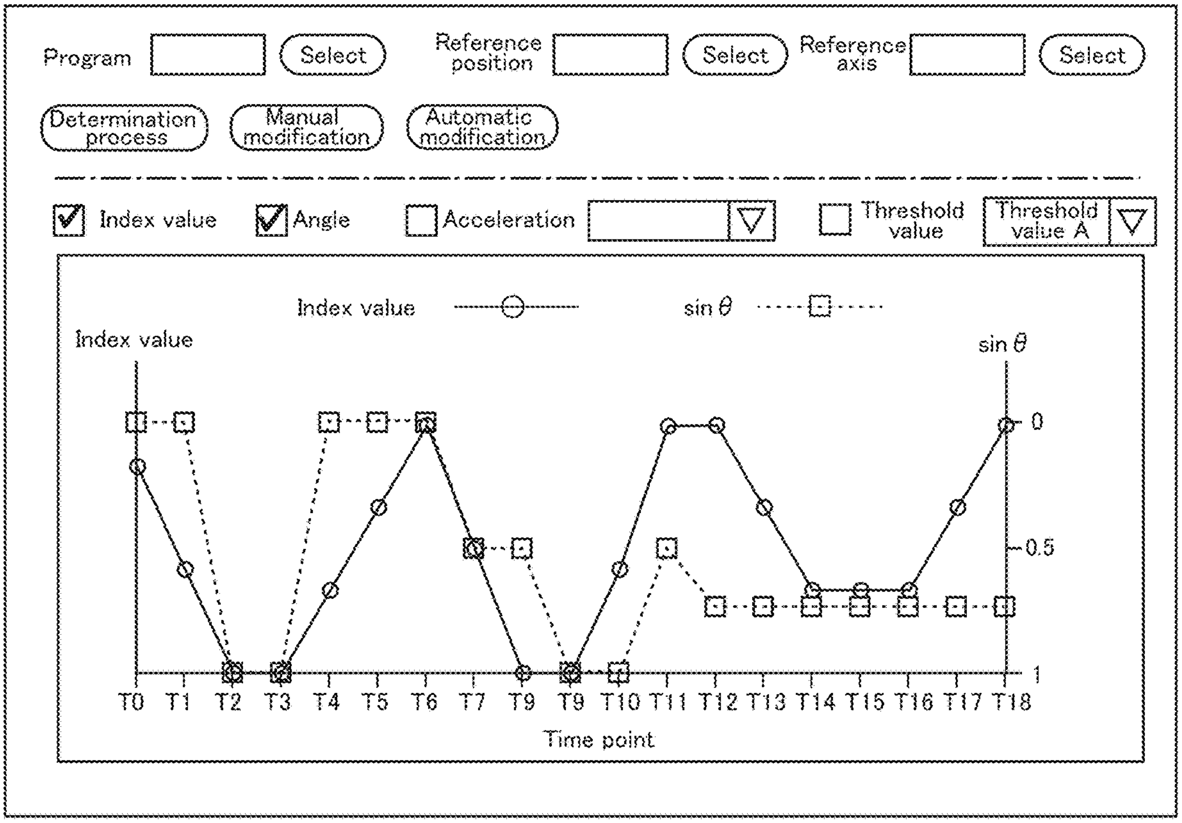
FIG. 9 shows a second example of the determination page created by the determination page creation unit shown in FIG. 2.
Figure 10:
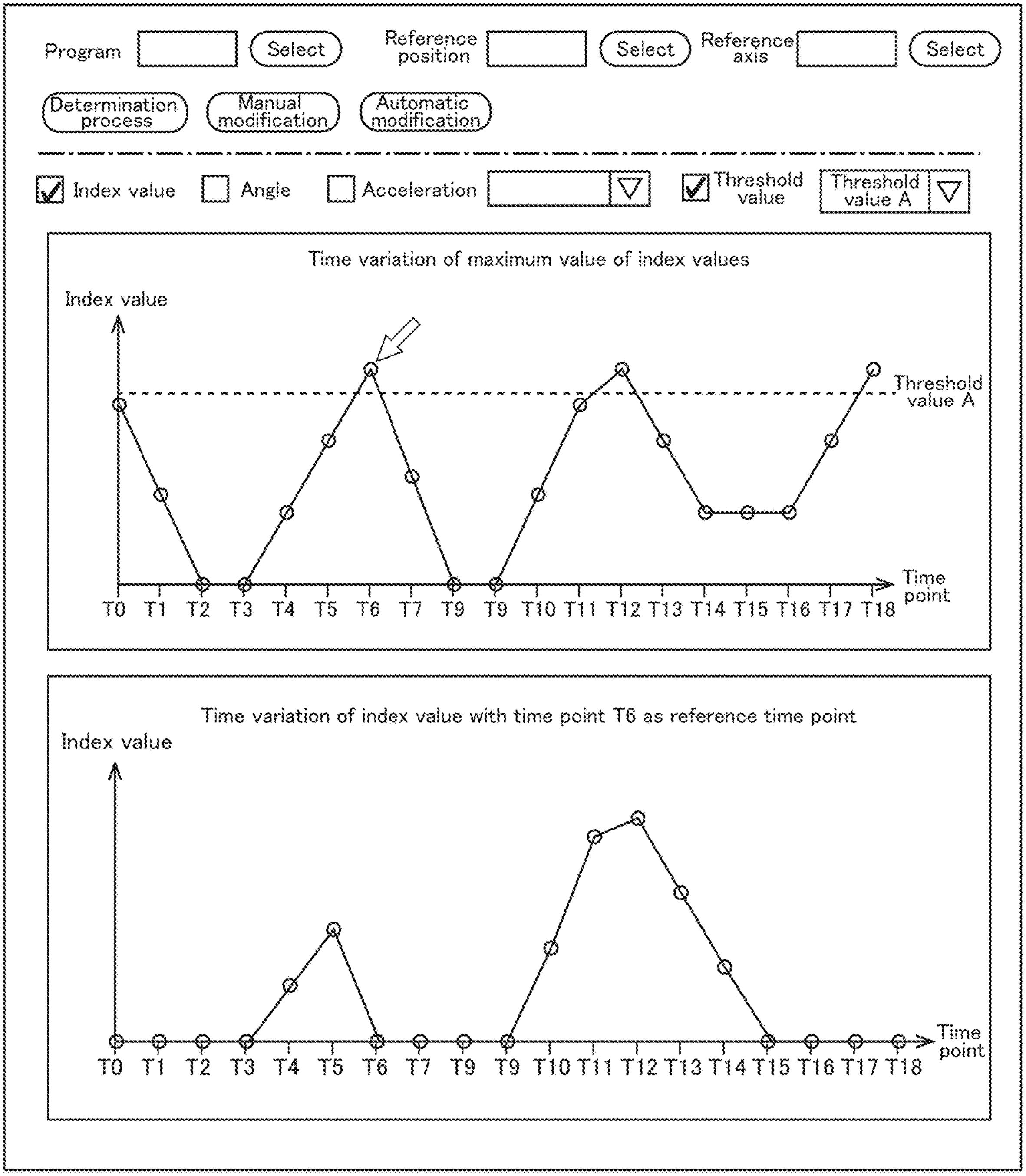
FIG. 10 shows a third example of the determination page created by the determination page creation unit shown in FIG. 2.

FIG. 8, FIG. 9, and FIG. 10 each show an example of the determination page created by the determination page creation unit 26. As shown in FIG. 8, FIG. 9, and FIG. 10, the determination page includes a plurality of UI elements for inputting and selecting various items and a graph display area. The plurality of UI elements include a selection button for displaying a dialog box for selecting a file, a registration button for displaying a three-dimensional model of the robot device 7 for registering the reference position, a registration button for registering the reference position, four check boxes for selecting a graph to be displayed in the graph display area, a pull-down menu for selecting a threshold value to be displayed in the graph, a pull-down menu for selecting a type of acceleration vector to be displayed in a graph relating to an acceleration vector, a determination process button to trigger execution of a determination process, a manual modification button for the user to manually modify the operation program 62, an automatic modification button for automatically modifying the operation program 62, and the like. Note that the determination page may display the result of the determination on the possibility of fatigue fracture occurring in the robot hand 9 by the determination unit 24. For example, the determination unit 24 determines that "there is a possibility of fatigue fracture" when there is a time point where the index value is smaller than the threshold value and a large stress amplitude that is likely to cause fatigue fracture is applied. The determination page displays text notifying the user that there is a possibility of fatigue fracture.

When the determination process button is clicked, an acceleration vector calculation process, an index value calculation process, an angle calculation process, and a determination process are executed based on the input operation program, and various graphs are displayed. When the manual modification button is clicked, an operation program as shown in FIG. 7 is displayed, and the user can manually modify the operation program. When the automatic modification button is clicked, a program modification process by the program modification unit 27 is executed, and the operation program is automatically modified. After the operation program is modified manually or automatically, by clicking the determination process button again, the acceleration speed vector calculation process, the index value calculation process, the angle calculation process, and the determination process are executed based on the modified operation program, and various graphs are displayed. By referring to the graph displayed on the determination page, the user can confirm whether or not the operation program has been modified correctly, specifically, so that there is no time point where a large stress amplitude that may cause fatigue fracture is applied to the robot hand 9.

The four check boxes correspond to 'index value', 'angle', 'acceleration', and 'threshold value', respectively.

As shown in FIG. 8, FIG. 9, and FIG. 10, the user can check the check box corresponding to the 'index value' to have the graph display area display a graph corresponding to the time variation of the maximum value of the index values created by the graph creation unit 25.

The graph corresponding to the time variation of the maximum value of the index values plots the maximum values of the index values at respective time points. As described with reference to FIG. 5, for example, the maximum value of the index values at the time point TO is identified as follows. That is, the inner product value of acceleration vectors (Vt0 and Vt1, Vt0 and Vt2, . . . , and Vt0 and Vt18) is calculated for each of the combinations of the reference time point T0 and the other time points (T1, T2, . . . , and T18). Then, a combination of acceleration vectors where the inner product value with the acceleration vector Vt0 corresponding to the time point TO has negative polarity and the absolute value of the inner product value is maximum is identified. Here, the polarity of the inner product value between the acceleration vector Vt0 corresponding to the time point TO and the acceleration vector Vt12 corresponding to the time point T12 is negative, and the absolute value thereof is maximum. Accordingly, the maximum value of the index values at the time point T0 is the inner product value of Vt0. Vt12. In this manner, the maximum value of the index values with respect to each of the other time points (T1, T2, . . . , and T18) is also calculated.

In the graph corresponding to the time variation of the maximum value of the index values, the horizontal axis indicates the passage of time, and the vertical axis indicates the magnitude of the index value. The vertical axis shows that the upper the index value, the larger the index value, i.e., the smaller the inner product value.

By referring to the graph corresponding to the time variation of the maximum value of the index values and confirming the magnitude of the index value, the user can determine whether or not there is an operation point (time point) where a large stress amplitude is applied to the robot hand 9, i.e., an operation point that is likely to cause fatigue fracture. Various types of information can be displayed on the determination page to assist the user in making the determination.

In FIG. 8, a threshold value is superimposed on the graph corresponding to the time variation of the maximum value of the index values. The index value for determining whether there is a pair of operation points (time points) by which a large stress amplitude causing fatigue fracture is applied varies depending on the member, dimensions, shape, and physical properties of the part set as the reference position of the robot device 7. Therefore, displaying the threshold value on the graph corresponding to the time variation of the maximum value of the index values assists the user in making the determination. Note that it is desirable to have a threshold value for each reference position of the robot device 7. Alternatively, it is desirable to have a threshold value for each combination of the member type, thickness, shape, and the like.

The user selects a threshold value A corresponding to the robot hand 9 as the threshold value to be displayed on the graph corresponding to the time variation of the maximum value of the index values. By referring to the graph in FIG. 8, the user can easily identify the time points T6, T11, T12, and T18 where the index values are larger than the threshold value A as the time points where a large stress amplitude causing fatigue fracture is applied.

In FIG. 9, a graph corresponding to the time variation of the angle is superimposed on the graph corresponding to the time variation of the maximum value of the index values. In the graph corresponding to the time variation of the angle, the vertical axis indicates the sine value of the angle formed by the reference axis and the acceleration vector, and the horizontal axis indicates the passage of time. The reference axis is set in a direction that is vulnerable to fatigue fracture. That is, when the sine value is '0' or a value close to '0', it indicates that the direction of the acceleration vector is parallel to the direction that is vulnerable to fatigue fracture or slightly inclined with respect to the direction that is vulnerable to fatigue fracture. Depending on the point set as the reference position of the robot device 7, some directions are more susceptible to the stress amplitude and more vulnerable to fatigue fracture, such as the thin direction of the member.

Accordingly, for example, even when the index value corresponding to a first time point is small, if the direction of the acceleration vector corresponding to the first time point is parallel or slightly inclined with respect to the direction that is vulnerable to fatigue fracture, it may be better to determine the first time point as the time point that causes fatigue fracture. On the other hand, even when the index value corresponding to the second time point is large, if the direction of the acceleration vector corresponding to the second time point is strong against fatigue fracture, it may not be necessary to determine the second time point as the time point that causes fatigue fracture. In this way, by being able to confirm the time variation of the maximum value of the index values and the time variation of the angle on the same time axis, it is possible to identify a time point where the direction of the acceleration vector acts along a direction that is vulnerable to fatigue fracture although the index value is small, which cannot be extracted only from the graph showing the time variation of the maximum value of the index values. For example, by referring to the graph in FIG. 9, the user can identify not only the time points T6, T11, T12, and T18 where the index value is large but also the time points T0 and T5 where the index value is not large but the acceleration/deceleration is performed along the direction that is vulnerable to fatigue fracture as the time points that cause fatigue fracture.

In FIG. 10, the graph corresponding to the time variation of the maximum value of the index values when a time point selected by a user operation on the graph corresponding to the time variation of the maximum value of the index values is set as a reference is shown together with the graph corresponding to the time variation of the maximum value of the index values. For example, as shown in FIG. 10, in the graph corresponding to the time variation of the maximum value of the index values, when the plot of the time point T6 where the index value is large is selected, the graph corresponding to the time variation of the index value with the time point T6 as a reference is displayed. By referring to the graph in FIG. 10, the user can confirm that the time point T6 and the time point T12 are a time point pair with which the maximum value of the index values has been calculated, and are a time point pair by which a large stress amplitude that is likely to cause fatigue fracture is applied. As described above, the graph corresponding to the time variation of the maximum value of the index values and the graph corresponding to the time variation of the index value with respect to a specific time point are shown together, whereby it is possible to identify a time point pair by which a large stress amplitude that is likely to cause fatigue fracture is applied. In addition, by confirming the graph corresponding to the time variation of the index value when a specific time point is set as a reference, the user can confirm how much stress amplitude the specific time point causes to the robot hand 9 in the entire operation period in combination with each of the other time points. For example, even when the maximum value of the index value corresponding to a specific time point is larger than the threshold value, and it can be determined that the time point is not a time point where a large stress amplitude that causes fatigue fracture is applied, if the index values of combinations of the specific time point and the plurality of other time points are large values close to the threshold value as a whole, the specific time point should be determined to be a time point that is likely to cause fatigue fracture as a whole. Thus, by referring to the graph in FIG. 10, the user can examine in detail the time point which causes fatigue fracture.

The information processing apparatus 1 according to the present embodiment described above can provide the user with a material for determining the possibility of fatigue fracture occurring at a specific point of the robot device when the robot device 7 is operated in accordance with the operation program. Specifically, it is possible to calculate a plurality of acceleration vectors respectively corresponding to a plurality of time points during the operation period and display a graph corresponding to the time variation of the index value for evaluating the magnitude of the stress amplitude, based on the plurality of acceleration vectors. As a result, the user can confirm at which time point the operation is an influencing factor that causes fatigue fracture in the robot hand 9 in the series of operations. If the operation program includes an operation that is likely to cause fatigue fracture, the user may modify the operation program so that the operation can be eliminated. Further, when it is difficult to modify the operation program due to the limitation of the cycle time or the like, the strength of the point where the fatigue fracture may occur can be improved to prevent fatigue fracture in advance. Since the determination process by the information processing apparatus 1 according to the present embodiment can be performed before the robot device 7 is actually operated, the determination result can be used for manufacturing the robot hand 9.

Figure 11:
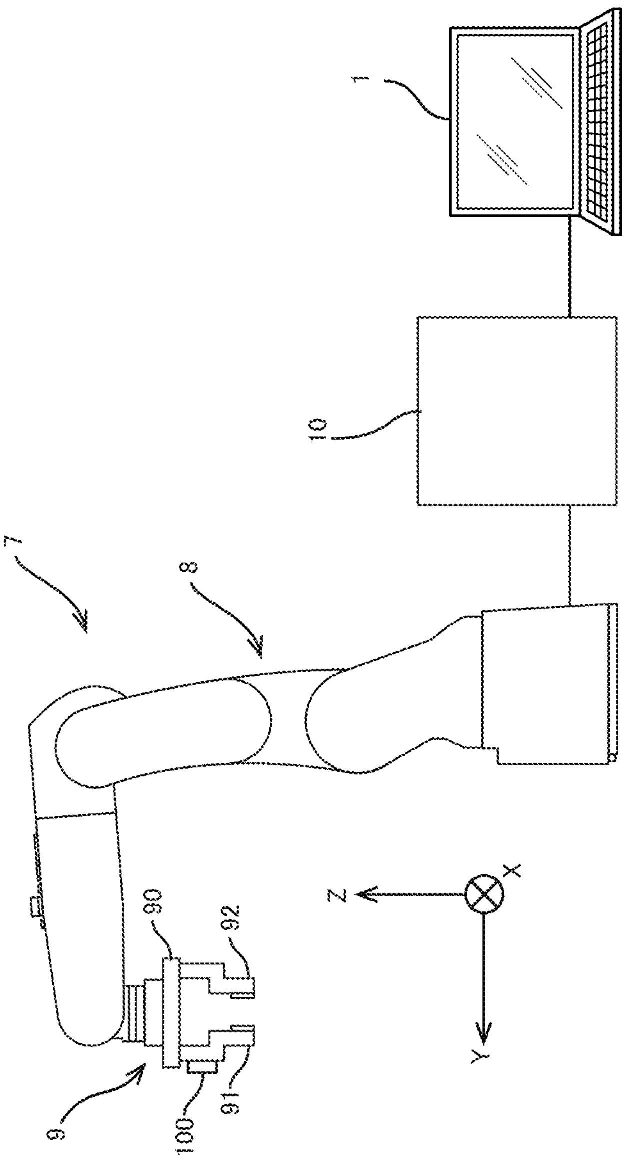
FIG. 11 shows another example of the robot system including the information processing apparatus according to the present embodiment.

In the present embodiment, the acceleration vectors are calculated based on the operation program, but the acceleration vectors may be calculated using operation information when the robot device 7 is actually operated in accordance with the operation program. For example, as shown in FIG. 11, an acceleration sensor 100 is attached to a point for which the possibility of fatigue fracture is to be evaluated, in this case, the robot hand 9. The control device 10 controls the robot device 7 in accordance with the operation program, and collects sensor information of the acceleration sensor 100 while the robot device 7 is in operation. The sensor information during the operation period collected by the control device 10 is provided to the information processing apparatus 1. The information processing apparatus 1 can calculate a plurality of acceleration vectors respectively corresponding to a plurality of time points during the operation period, based on the sensor information during the operation period.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. An information processing apparatus configured to reduce a risk of fatigue fracture of a robot or an end effector attached to the robot, the information processing apparatus comprising:

a processor configured to:

calculate, based on an operation program or operation information obtained when the robot is actually operated in accordance with the operation program, a plurality of acceleration vectors corresponding to a plurality of time points during a period in which a reference position of the robot moves from a starting point to an ending point;

calculate, based on the plurality of acceleration vectors, a plurality of index values, wherein the plurality of index values are inner product values of the acceleration vectors for respective combinations of two time points among the plurality of time points, and each of the plurality of index values represents a magnitude of a stress amplitude generated at the reference position due to inertial forces acting on the reference position;

perform an evaluation of the stress amplitude based on a polarity and an absolute value of each inner product value, such that when the polarity of an inner product value is negative, inertial forces acting in mutually opposite directions are applied to the reference position, and a larger absolute value of the inner product value indicates a larger stress amplitude;

modify the operation program based on a result of the evaluation of the stress amplitude so as to reduce the stress amplitude at the reference position; and provide the modified operation program to a control device to control the robot in accordance with the modified operation program, thereby reducing the risk of fatigue fracture of the robot or the end effector attached to the robot.

2. The information processing apparatus according to claim 1, wherein the processor is configured to determine a possibility of fatigue fracture occurring at the reference position based on a minimum value of the inner product values.

3. The information processing apparatus according to claim 2, wherein the processor is configured to determine the possibility of fatigue fracture occurring at the reference position by comparing the minimum value of the inner product values with a threshold value.

4. The information processing apparatus according to claim 1, further comprising a display configured to display a graph representing a variation of the inner product values.

5. The information processing apparatus according to claim 4, wherein the display is configured to display a threshold value superimposed on the graph.

6. The information processing apparatus according to claim 1, wherein the processor is configured to determine a possibility of fatigue fracture occurring at the reference position based on the plurality of index values.

7. The information processing apparatus according to claim 6, wherein the processor is configured to calculate an angle of each of the plurality of acceleration vectors with respect to a reference axis, and determine the possibility of fatigue fracture occurring at the reference position based on the plurality of index values and the angle.

* * * * *